United States Patent [19]

Ishikawa et al.

[11] Patent Number: 4,689,698

[45] Date of Patent: Aug. 25, 1987

[54] DISK DRIVE CONTROL FOR INHIBITING OPERATION UPON BATTERY VOLTAGE DROP

[75] Inventors: Shigeki Ishikawa; Satoshi Furukawa, both of Nagoya, Japan

[73] Assignee: Brother Kogyo Kabushiki Kaisha, Aichi, Japan

[21] Appl. No.: 629,163

[22] Filed: Jul. 5, 1984

[30] Foreign Application Priority Data

Jul. 11, 1983 [JP] Japan ................. 58-125741
Jul. 11, 1983 [JP] Japan ................. 58-125742

[51] Int. Cl.⁴ .............. G11B 19/04; G11B 19/02
[52] U.S. Cl. ................ 360/69; 360/74.1; 360/75
[58] Field of Search ........... 360/69, 60, 137, 74.1, 360/71, 73, 75, 78, 97-99, 55; 371/66; 369/233, 235, 243; 364/200, 900

[56] References Cited

U.S. PATENT DOCUMENTS 3,956,740  5/1976  Jones et al. .......... 360/137 X
4,461,003  7/1984  Tamaki .................. 371/66

FOREIGN PATENT DOCUMENTS 56-140568  11/1981  Japan ................. 360/137
58-130408   8/1983  Japan ................. 360/69
58-211359  12/1983  Japan ................. 360/137

OTHER PUBLICATIONS

IEEE Transaction on Magnetics, vol. Mag.-14, No. 4, "Microprocessor Applications in Disk Storage Systems", Johann, 7/78, pp. 203-206.

Primary Examiner—Raymond F. Cardillo
Assistant Examiner—Steven R. Garland
Attorney, Agent, or Firm—Browdy and Neimark

[57] ABSTRACT

An apparatus for driving a magnetic disk for information storage and retrieval, comprising a battery for supplying electric power to a first actuator for rotating the magnetic disk, and to a second actuator for moving a magnetic head across a surface of the magnetic disk and energizing the head to write information on and read the information from the magnetic disk. The apparatus further comprising a detector for sensing a voltage level of the battery, and generating a voltage-drop signal when the voltage level of the battery has fallen below a preset limit. A control unit is provided for controlling the first and second actuators. The control unit is responsive to the voltage-drop signal to inhibit the starting of an access to the magnetic disk, or inhibit the operation of the first actuator.

22 Claims, 4 Drawing Figures

S2: CPU 6 CHECKS IF A VOLTAGE-DROP SIGNAL IS PRESENT
S3: CPU 6 CHECKS IF A DATA-READING COMMAND SIGNAL IS PRESENT
S5: CPU 6 CHECKS IF DATA READING IS COMPLETED
S6: CPU 6 CHECKS IF A DATA-WRITING COMMAND SIGNAL IS PRESENT
S8: CPU 6 CHECKS IF DATA WRITING IS COMPLETED

S2: CPU 6 CHECKS IF A VOLTAGE-DROP SIGNAL IS PRESENT
S3: CPU 6 CHECKS IF A DATA-READING COMMAND SIGNAL IS PRESENT
S5: CPU 6 CHECKS IF DATA READING IS COMPLETED
S6: CPU 6 CHECKS IF A DATA-WRITING COMMAND SIGNAL IS PRESENT
S8: CPU 6 CHECKS IF DATA WRITING IS COMPLETED

DISK DRIVE CONTROL FOR INHIBITING OPERATION UPON BATTERY VOLTAGE DROP

BACKGROUND OF THE INVENTION

The present invention relates to a battery-powered apparatus for driving a magnetic disk for storing information therein and retrieving the stored information therefrom.

A magnetic disk drive system is known, wherein a drive motor for rotating the magnetic disk is powered by a battery. The line voltage of the battery is gradually lowered as the cumulative operation time increases. A drop of the battery voltage level below a certain lower limit will make it impossible to achieve a stable operation of the drive motor, and consequently the voltage drop will lead to instability of rotation of the magnetic disk. In such a magnetic disk drive, however, data writing and reading operations on the magnetic disk are continued even after the rotating operation of the magnetic disk has become unstable due to voltage drop of the battery, as long as an access to the magnetic disk is possible at lowered voltage levels of the considerably exhausted battery.

Unstable rotations of the magnetic disk during data storage and retrieval may possibly cause data writing and reading errors. In the absence of suitable means for indicating the occurrence of such errors, the operator who is engaged in the data storage or retrieval may not recognize the presence of the errors due to the voltage drop of the battery to power the disk drive motor. This may lead to a problem that correct information is not written on or read from the magnetic disk.

SUMMARY OF THE INVENTION

It is therefore an object of the present invention to provide an improved apparatus for driving a magnetic disk, which prevents data writing and reading errors due to reduction in power of a battery supplied to a motor to drive the magnetic disk.

According to the invention, there is provided an apparatus for information storage and retrieval, comprising: (a) first drive means for rotating the magnetic disk; (b) a magnetic head for the information storage and retrieval on or from the magnetic disk; (c) second drive means for moving the magnetic head across a surface of the magnetic disk to different tracks on the disk surface, and energizing the magnetic head to write information on and read the information from the accessed tracks of the magnetic disk; (d) at least one battery for supplying electric power to the first and second drive means; (e) detecting means for sensing a voltage level of the battery, and generating a voltage-drop signal when the voltage level of the battery has fallen below a predetermined limit; and (f) control means for controlling the first and second drive means, the control means being responsive to the voltage-drop signal to inhibit the starting of an access to the magnetic disk.

In the magnetic disk driving apparatus constructed as described above, the operation of the apparatus to start an access to the magnetic disk for data writing and reading operations is inhibited by the control means if the voltage-drop signal is generated from the detecting means, i.e., after the voltage level of the battery has fallen below the predetermined limit. Accordingly, the detecting means and the control means cooperate to prevent otherwise possible errors of information writing and/or reading on or from the magnetic disk due to unstable rotation of the magnetic disk.

According to an advantageous embodiment of the invention, when the voltage-drop signal is generated after the start of an access to the magnetic disk, the control means permits the continuation of the access, and an operation of the magnetic head on the accessed track, and inhibits the starting of another access after the completion of said operation of the magnetic head. Preferably, the control means checks if the voltage-drop signal is present or not, each time at least one of series of information writing and reading operations on or from the magnetic disk has been completed.

It is noted that the voltage-drop signal is usually generated when the first drive means has been activated, i.e. after an access to the magnetic disk has been commanded and started to read or write designated data from or on the accessed track of the magnetic disk. According to the above embodiment, a commanded data reading or writing operation is not interrupted due to the voltage-drop signal generated in the process of the reading or writing operation.

According to another advantageous embodiment of the invention, the detecting means comprises an auxiliary battery, and a comparator which is connected at an output thereof to the control means, and at two inputs thereof to the at least one battery and the auxiliary battery, respectively, the auxiliary battery having a reference voltage level substantially equal to the predetermined lower limit of the at least one battery to power the first and second drive means, the comparator generating the voltage-drop signal when the voltage level of the at least one battery has fallen below the reference voltage level of the auxiliary battery.

According to a further advantageous embodiment of the invention, the control means comprises means for disconnecting the supply of the electric power of the at least one battery to the apparatus in response to the voltage-drop signal. This disconnecting means may disconnect the supply of the electric power to the control means, and/or the first and second drive means. The disconnecting means may be a power disconnect switch having a solenoid which is connected to a central processing unit of the control means. The solenoid is operated in response to the voltage-drop signal to disconnect the supply of the electric power. In the case where the power disconnect switch is provided to disconnect the power supply to the first drive means in response to the voltage-drop signal, the rotation of the first drive means and the magnetic disk is stopped, and therefore the operating sounds and vibration of the first drive means disappear, which may be an indication that the first drive means is unable to operate due to exhaustion of the battery.

According to another aspect of the invention, the previously indicated control means may be adapted to inhibit an operation of the first drive means in response to the voltage-drop signal. According to one embodiment of this aspect of the invention, the control means which generates drive control signals to activate the first and second drive means may comprise means for inhibiting the generation of the drive control signals while the voltage-drop signal is present.

According to another embodiment of the above aspect of the invention, the control means may comprise means for disconnecting the supply of the electric power of the at least one battery to the first drive means.

According to a further embodiment of the above aspect of the invention, the apparatus may further comprise means for indicating, upon generation of the voltage-drop signal, that the operation of the first drive means is inhibited due to a fall of the voltage level of the at least one battery below the predetermined limit. When this indicating means is used in combination with the disconnecting means indicated above, the indicating means may provide the indication for a relatively longer period of time, as the exhausted battery is disconnected from the first drive means which is the largest load applied to the battery.

The apparatus of the invention may be used in conjunction with an external device such as a battery-powered typewriter or microcomputer through which the information storage on and retrieval from the magnetic disk are commanded. The external device is connected to the control means of the apparatus.

The external device sends command signals to the control means to control the first and second drive means for operations of the magnetic disk and the magnetic head. When the magnetic disk driving apparatus is constructed according to the above described another aspect of the invention, the control means may comprise means for preventing the control of the first and second drive means even when the command signals from the external device are received by the control means while the voltage-drop signal is present. In this instance, it is appreciated that the control means sends a signal to the external device to indicate that the operation of the first drive means is inhibited due to a fall of the electric power supplied thereto.

BRIEF DESCRIPTION OF THE DRAWING

The above and other objects, features and advantages of the present invention will become apparent from reading the following description of the preferred embodiments taken in connection with the accompanying drawing in which.

DETAILED DESCRIPTION OF THE PREFERRED EMBODIMENTS

Figure 1:
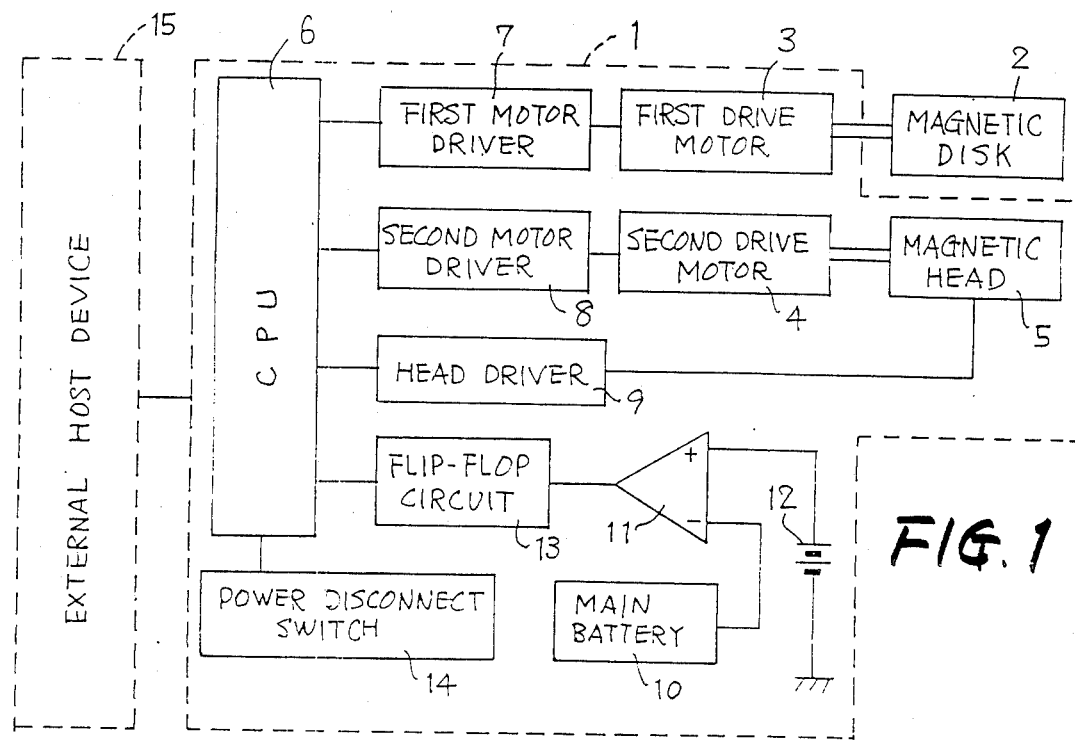
FIG. 1 is a schematic block diagram showing one embodiment of a magnetic disk driving apparatus of the invention used in connection with an external host device.

The preferred embodiments of the invention will now be described with reference to FIGS. 1–4 of the drawing. Identical elements illustrated in the figures are designated with the same reference numerals.

FIG. 1 shows a first embodiment of an apparatus, generally indicated at 1, for driving a magnetic disk 2 for storing data thereon and/or retrieving the stored data therefrom.

The apparatus 1 comprises a first drive motor 3 coupled to the magnetic disk 2 to rotate the same, and a second drive motor 4 coupled to a magnetic head 5 to move the head 5 across a surface of the magnetic disk 2 in its radial direction so that data may be written on selected tracks on the disk surface. The magnetic disk 2 has, for example, 40 tracks on each one of two hard sectors thereof which are selected by rotation of the disk. The tracks on which data is written or from which the written data is read, are selected by movement of the magnetic head 5 across the surface of the disk 2. The first and second drive motors 3 and 4 are connected to a central processing unit 6 (hereinafter referred to as "CPU 6") via a first and a second motor driver 7, 8, respectively. The CPU 6 applies drive control signals to the first and second motor drivers 7 and 8 which generate drive signals to activate the first and second drive motors 3 and 4, respectively. The magnetic head 5 is connected to the CPU 6 via a head driver 9 which generates drive signals to energize the magnetic head 5 to write information on the accessed tracks of the magnetic disk 2, and read the stored information from the disk 2.

The entire apparatus 1 is powered by a main battery 10, i.e., electric power of the battery 10 is supplied to the drivers 7, 8, 9, CPU 6, and the other electrically operated components. To detect a drop of the voltage level of the main battery 10, detecting means is provided, which includes a comparator in the form of an operational amplifier 11 which has an inverting input connected to the main battery 10, and a non-inverting input connected to an auxiliary battery 12. The auxiliary battery 12 connected to the non-inverting input of the comparator 11, provides a reference voltage which is equal to a permissible lower limit of the voltage level of the main battery 10 necessary for normal operation of the apparatus 1 (driver 7, CPU 6, etc.). The operational amplifier 11 is connected at its output to the CPU 6 through a flip-flop circuit 13. In the event the voltage level of the main battery 10 has fallen below the reference voltage level of the auxiliary battery 12, the operational amplifier 11 generates a voltage-drop signal.

The electric power of the main battery 10 is supplied to the electrically operated components of the apparatus 1 via a power disconnect switch 14 which is connected to the CPU 6. The disconnect switch 14, when placed in its OFF position, disconnects the supply of the power of the battery 10 to the apparatus 1. The switch 14 is biased by a spring (not shown) toward the OFF position and normally held in the OFF position. By sliding an operation knob (not shown) of the switch 14, the switch is movable against the resiliency of the biasing spring to its ON position at which the switch 14 is locked by a latch (not shown). In this ON position, the power of the main battery 10 is supplied to the apparatus 1. The lock of the switch 14 at the ON position may be released either manually by moving the operation knob of the OFF position, or automatically through energization of a solenoid (not shown) which is incorporated in the switch 14 and controlled by the CPU 6.

The magnetic disk driving apparatus 1 of the invention with the above arrangement is used in conjunction with a commanding device in the form of an external host device 15, such as an electronic typewriter controlled by a central processing unit, or a microcomputer. The apparatus 1 is connected to the external host device 15 through a suitable connector for interactive data communication between the CPU 6, and the external device 15 which is adapted to generate command signals to the CPU 6 to control the drivers 7–9 for writing data on the magnetic disk 2 or reading the stored data from the disk 2. The external host device 15 is also powered by a battery.

Figure 2:
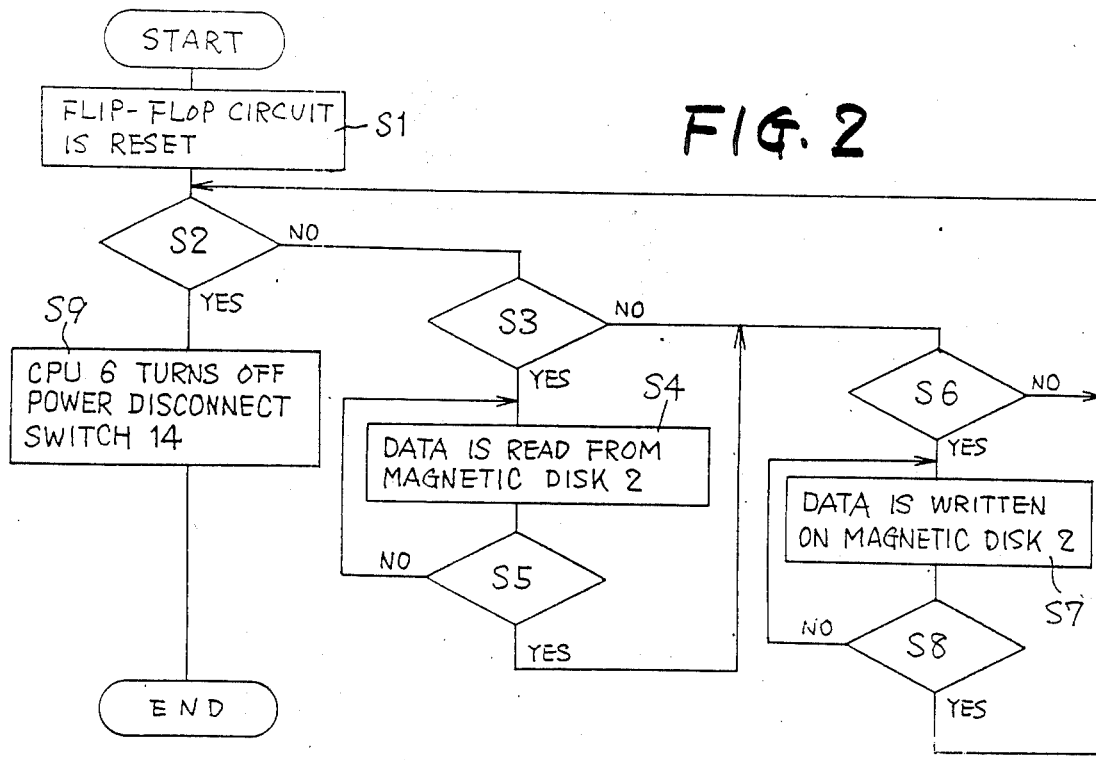
FIG. 2 is a flow chart showing the operation of the apparatus of FIG. 1.

Referring next to FIG. 2, the operation of the apparatus 1 will be described. For easy understanding, step numbers (numbers followed by letter S) to indicate events of operations are given in FIG. 2 and indicated in parentheses in the following description.

With the disconnect switch 14 set to its ON position, the magnetic head 5 is moved to its access-start position, and the flip-flop circuit 13 is brought into its reset state (S1). The magnetic disk 2 is inserted in place in the apparatus, but the first drive motor 3 is held at rest until the CPU 6 receives from the host device 15 a command signal to effect an access to a desired track on the magnetic disk 2 to write or read a specific amount of data on or from the accessed track. In this condition, therefore, the magnetic disk 2 is held at rest.

Then, the CPU 6 checks if the voltage-drop signal is maintained in the flip-flop circuit 13, i.e., checks if the flip-flop circuit 13 has been brought into its set state by the voltage-drop signal generated from the operational amplifier 11. In other words, the CPU 6 checks to see if the voltage level of the main battery 10 has fallen below the preset lower limit which is defined by the reference voltage of the auxiliary battery 12 applied to the non-inverting input of the amplifier 11 (S2).

If the voltage-drop signal is not present, the CPU 6 goes to the next step (S3) wherein the CPU 6 checks if a command signal for data reading (hereinafter called "data-reading command signal") from the host device 15 is present. If the data-reading command signal is present, the CPU 6 directs the first motor driver 7 to drive the first drive motor 3 for starting the rotation of the magnetic disk 2, and then the CPU 6 generates appropriate control signals to activate the magnetic head 5 through the drivers 8 and 9 for reading data from a designated track or tracks of the magnetic disk 2 (S4).

Subsequently, the CPU 6 checks if the commanded data reading operation has been completed (S5). If the reading operation has not been completed, the CPU 6 goes back to step S4 to continue the data reading operation. The first drive motor 3 is stopped a predetermined time after the completion of the data reading operation. Then, the CPU 6 checks if a command signal for data writing (hereinafter called "data-writing command signal") from the host device 15 is present (S6). In the case where the judgement in step S3 reveals that the data-reading command signal is not present, the CPU 6 also goes to step S6 to check for the presence of the data-writing command signal.

If the data-writing command signal is present, the CPU 6 generates appropriate control signals according to the information transferred from the host device 15, to activate the magnetic head 5 through the drivers 8 and 9 for writing the transferred data on the designated track or tracks of the magnetic disk 2 (S7). In this step S7, the CPU 6 causes the first drive motor 3 to be activated if the motor 3 stopped, i.e., if the data writing command signal is generated the predetermined time after the completion of the preceding data reading operation. Subsequently, the CPU 6 goes to the next step (S8) to check if the data writing operation has been completed. If this writing operation has not been completed, the CPU 6 goes back to step S7 to continue the data writing operation. The first drive motor 3 is stopped the predetermined time after the completion of the data writing operation. As suggested previously, the first drive motor 3 is activated in steps S4 and S7 if a data-reading or data-writing command signal which is checked in steps S3 and S6 is generated a predetermined time interval after the completion of the data reading or writing operation based on a preceding data-reading or data-writing command signal.

Upon completion of the data writing operation, the CPU 6 goes back to step S2 to check if the voltage-drop signal is present. The CPU 6 also returns to step S2 where the judgement in step S6 reveals that no data-writing command signal is present. Thus, the CPU 6 checks for the presence of the voltage-drop signal each time at least one of the information reading and writing operations has been completed. Stated more specifically, the checking of the voltage-drop signal by the CPU 6 in step S2 is carried out at the end of a data reading or writing operation. However, the amount of data which has been written on or read from the magnetic disk 2 exceeds a storage capacity of one track in one of the two hard sectors of the disk 2, the CPU 6 goes to step S2 to check for the presence of the voltage-drop signal.

In the event that the voltage-drop signal was generated during the data writing or reading operation, the signal is maintained by the flip-flop circuit 13. When the judgement in step S2 reveals that the voltage-drop signal is present, the CPU 6 goes to the next step (S9) wherein the solenoid of the power disconnect switch 14 is energized to move the switch 14 to its OFF position, whereby the supply of the electric power of the main battery 10 to the entire apparatus 1 is disconnected.

While the disconnect switch 14 used in this embodiment is adapted to disconnect the power to the entire apparatus 1, it is possible that the switch 14 disconnects the power supply to the CPU 6, or to the first and second motor drivers 7 and 8. In any event, the CPU 6 is adapted to inhibit the starting of an access to the magnetic disk 2 if the voltage-drop signal is generated.

As suggested by the foregoing description, in the event of generation of the voltage-drop signal during a data-reading or data-writing operation, the CPU 6 permits the commanded data-reading or -writing operation to be completed. After the completion of the data-reading or -writing operation based on the preceding data-reading or data-writing command signal, the CPU 6 goes to step S2, and as a result directs the disconnect switch 14 to turn off the apparatus 1, that is, to inhibit the execution of the following command signal. If the voltage-drop signal is generated before the reception of a data-reading or data-writing command, the disconnect switch 14 is turned off immediately after the voltage-drop signal is received by the CPU 6.

Figure 3:
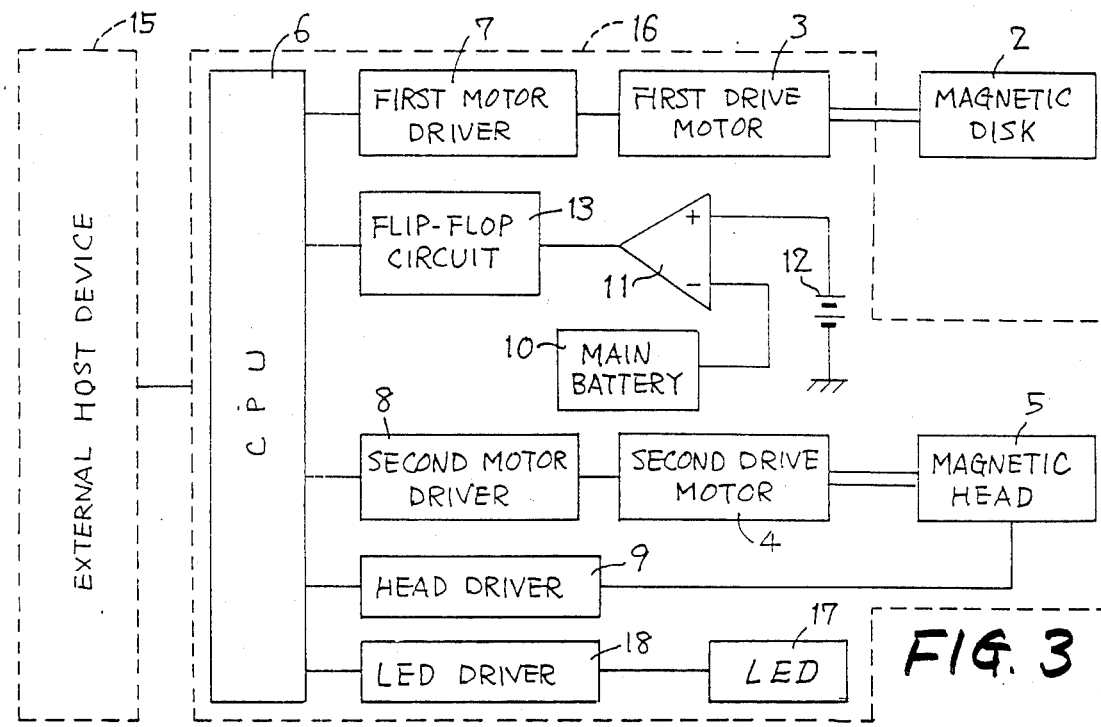
FIG. 3 is a schematic block diagram, corresponding to FIG. 1, showing another embodiment of the invention.
Figure 4:
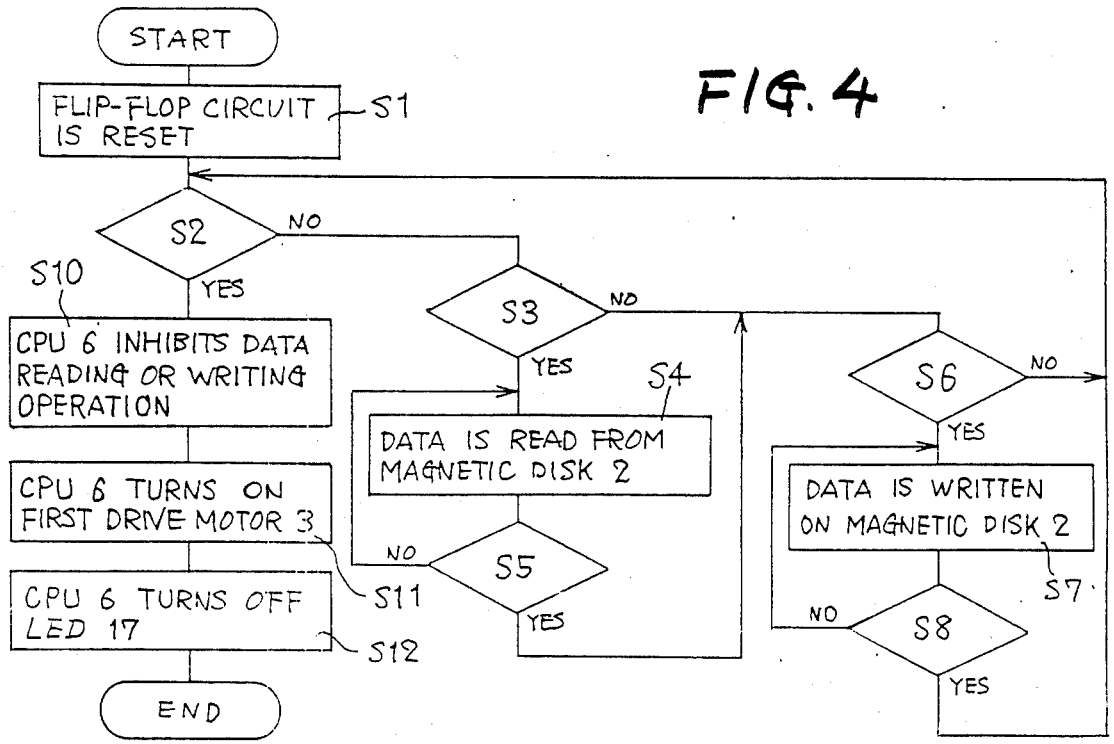
FIG. 4 is a flow chart, corresponding to FIG. 2, showing the operation of the embodiment of FIG. 3.

Referring further to FIGS. 3 and 4, another preferred embodiment of the invention will be described.

This magnetic disk driving apparatus generally indicated at 16, is provided with a light emitting diode 17 (hereinafter referred to as "LED 17") which is connected to the CPU 6 via a LED driver 18. This LED 17 is activated by the CPU 6 upon receipt of the voltage drop signal to indicate the voltage drop of the battery 10 below the predetermined lower limit.

In this embodiment, the same steps of operations (S1–S8) as taken in the preceding embodiment of FIGS. 1-2 are performed while the voltage-drop signal is not present.

If the voltage-drop signal is generated, the CPU 6 inhibits its operation to respond to the data-reading and -writing command signals from the host device 15, that is, the CPU 6 does not control the drivers 7-9 even when the command signals are received (S10). In this condition, the host device 15 is not able to obtain an access to the desired positions on the magnetic disk 2.

This step S10 is followed by a step (S11) wherein the first drive motor 3 to drive the magnetic disk 2 is stopped. More specifically, the drive control signals to the first motor driver 7 to rotate the magnetic disk 2 are cut. Subsequently, the CPU 6 turns on the LED 17 to indicate that the voltage level of the main battery 10 has fallen below the permissible lower limit (S12). In other word, the illumination of the LED 17 warns the operator of the host device 15 that the rotation of the magnetic disk 2 is inhibited due to a voltage drop of the battery 10.

As in the preceding embodiment, the flip-flop circuit 13 is reset when the apparatus is turned on by a power switch (not shown). Unlike the power disconnect switch 14 of the preceding embodiment, this power switch is not used to disconnect the power supply to the entire apparatus in response to the voltage-drop signal.

The flip-flop circuit 13 is brought into its set state when the voltage-drop signal is generated from the operational amplifier 11, i.e., when the voltage of the battery 10 applied to the inverting input of the amplifier 11 has fallen below the reference voltage of the auxiliary battery 12. With the flip-flop circuit 13 brought into the set state, the CPU 6 turns off the first drive motor 3 to stop the rotation of the magnetic disk 2. With the first drive motor 3 stopped, the load applied to the main battery 10 is reduced, with a result of an increase in the voltage level applied to the inverting input of the amplifier 11. This increase will cause the output of the amplifier 11 to be inverted, but will not cause the CPU to turn on the first drive motor (3) since the voltage drop signal was previously detected (s 2). That is, the increase in the voltage of the battery 10 will not cause the first drive motor 3 to start.

It is noted that the first drive motor 3 is the largest load to be applied to the main battery 10. Therefore, the stopping of this motor 3 enables the battery 10 to supply enough power to the CPU 6, LED driver 18 and LED 17, whereby the LED 17 may be energized to indicate the exhaustion of the battery 10, for a relatively longer period of time.

As in the embodiment of FIGS. 1 and 2, the CPU 6 checks for the presence of the voltage-drop signal each time at least one of the information reading and writing operations has been completed. Thus, in the event of generation of the voltage-drop signal after the start of an access to the magnetic disk 2 in response to a command signal from the host device 15, the CPU permits the continuation of the operation of the first drive motor 3, but inhibits the starting of the following operation of the drive motor 3 in response to the next command signal from the host device 15.

While the present invention has been described in its preferred embodiments, it is to be understood that the invention is not limited thereto; but may be otherwise embodied within the scope of the invention defined in the appended claims.

For example, the CPU 6 may be adapted to send a signal to the external host device 15 to indicate that the operation of the apparatus 1, 16 is inhibited due to a fall of the voltage level of the main battery 10. In the second embodiment, it is possible to provide a power disconnect switch which is responsive to the voltage-drop signal in order to disconnect the supply of electric power of the battery 10 to the first motor driver 7, and/or the drivers 8, 9. Further, the LED 17 may be replaced by another indicating means which provides a visible or audible indication or alarm.

What is claimed is:

1. An apparatus using a magnetic disk for information storage and retrieval, comprising:
   first drive means for rotating the magnetic disk;
   a magnetic head for said information storage and retrieval on or from said magnetic disk;
   second drive means for moving said magnetic head across a surface of said magnetic disk;
   a head driver for energizing said magnetic head to write information on and read the information from said magnetic disk;
   at least one battery for supplying electric power to said first and second drive means, and said head driver;
   detecting means for sensing a voltage level of said at least one battery, and generating a voltage-drop signal when said voltage level has fallen below a predetermined limit; and
   control means, responsive to said voltage-drop signal, for controlling said first and second drive means and said head driver, said control means, in the event of reception of the voltage-drop signal after the start of an access to said magnetic disk, permitting the continuation of said access and inhibiting another access to the magnetic disk.

2. An apparatus according to claim 1, wherein in the event of reception of said voltage-drop signal after the start of said access, said control means permits said head driver to energize said magnetic head to effect at least one of information writing and reading operations on or from said magnetic disk.

3. An apparatus according to claim 2, wherein said control means comprises means for detecting the completion of at least one of information writing and reading operations on or from said magnetic disk, said control means checking said voltage-drop signal for its presence upon completion of said at least one of information writing and reading operations.

4. An apparatus according to claim 1, wherein said detecting means comprises an auxiliary battery, and a comparator which is connected at an output thereof to said control means, and at two inputs thereof to said at least one battery and said auxiliary battery, respectively, said auxiliary battery having a reference voltage level substantially equal to said predetermined limit, said comparator generating said voltage-drop signal when the voltage level of said at least one battery has fallen below said reference voltage level.

5. An apparatus according to claim 4, wherein said detecting means further comprises a flip-flop circuit connected to said control means and said output of the comparator, said flip-flop circuit being brought into a reset state upon application of the electric power of said at least one battery to the apparatus, and placed in a set state when said voltage-drop signal is generated from said comparator.

6. An apparatus according to claim 1, wherein said control means comprises means for disconnecting the supply of said electric power at least to said first drive means, either immediately after the reception of said voltage-drop signal if said voltage-drop signal is received before said start of an access, or after the completion of an information writing or reading operation on or from said magnetic disk if said voltage-drop signal is received during said information writing or reading operation.

7. An apparatus according to claim 6, wherein said control means further comprises a central processing unit controlling said first and second drive means and responsive to said voltage-drop signal, and a power disconnect switch having a solenoid which is connected to said central processing unit and operated in response to said voltage-drop signal to disconnect the supply of said electric power to the apparatus.

8. An apparatus using a magnetic disk for information storage and retrieval, comprising:
first drive means for rotating the magnetic disk;
a magnetic head for said information storage and retrieval on or from said magnetic disk;
second drive means for moving said magnetic head across a surface of said magnetic disk;
a head driver for energizing said magnetic head to write information on and read the information from said magnetic disk;
at least one battery for supplying electric power to said first and second drive means, and said head driver;
detecting means for sensing a voltage level of said at least one battery, and generating a voltage-drop signal when said voltage level has fallen below a predetermined limit;
control means, responsive to said voltage-drop signal, for controlling said first and second drive means and said head driver, said control means, in the event of reception of the voltage-drop signal after the start of an access to said magnetic disk, permitting the continuation of one operation of the first drive means during said access to the magnetic disk, and inhibiting another operation of said first drive means during another access to said magnetic disk.

9. An apparatus according to claim 8, wherein said control means checks said voltage-drop signal for its presence, each time at least one of information writing and reading operations on or from said magnetic disk has been completed.

10. An apparatus according to claim 8, wherein said control means generates drive control signals to activate said first drive means, and comprises means for inhibiting the generation of said drive control signals after the completion of at least one of information writing and reading operations after said voltage-drop signal is generated.

11. An apparatus according to claim 8, further comprising means for indicating, upon generation of said voltage-drop signal, that the operation of said first drive means is inhibited due to a fall of said voltage level of said at least one battery below said predetermined limit.

12. An apparatus according to claim 8, wherein said control means comprises means for disconnecting the supply of said electric power to said first drive means, either immediately after the reception of said voltage-drop signal if said voltage-drop signal is received before said start of an access, or after the completion of an information writing or reading operation if said voltage-drop signal is received during said information writing or reading operation.

13. An apparatus using a magnetic disk for information storage and retrieval, comprising:
first drive means for rotating the magnetic disk;
a magnetic head for said information storage and retrieval on or from said magnetic disk;
second drive means for moving said magnetic head across a surface of said magnetic disk;
a head driver for energizing said magnetic head to write information on and read the information from said magnetic disk;
at least one battery for supplying electric power to said first and second drive means, and said head driver;
detecting means for sensing a voltage level of said at least one battery, and generating a voltage-drop signal when said voltage level has fallen below a predetermined limit;
maintaining means which is brought into a first state upon application of the electric power of said at least one battery to the apparatus and placed in a second state upon reception of the voltage-drop signal; and
control means, responsive to said voltage-drop signal, for controlling said first and second drive means and said head driver, said control means being connected to said maintaining means and, in the event that the maintaining means is placed in said second state after the start of an access to said magnetic disk, permitting the continuation of said access even if the voltage-drop signal becomes absent and inhibiting another access to the magnetic disk.

14. An apparatus according to claim 13, wherein said maintaining means is a flip-flop circuit which is brought into a reset state upon application of the electric power of said at least upon battery to the apparatus and placed in a set state upon reception of the voltage-drop signal.

15. An apparatus according to claim 14, wherein said detecting means comprises an auxiliary battery, and a comparator which is connected to an output thereof to said flip-flop circuit, and at two inputs thereof to said at least one battery and said auxiliary battery, respectively, said auxiliary battery having a reference voltage level substantially equal to said predetermined limit, said comparator generating said voltage-drop signal when the voltage level of said at least one battery has fallen below said reference voltage level.

16. A system for information storage and retrieval on or from a magnetic disk, comprising;
first drive means for rotating the magnetic disk;
a magnetic head for said information storage and retrieval on or from said magnetic disk;
second drive means for moving said magnetic head across a surface of said magnetic disk;
a head driver for energizing said magnetic head to write information on and read the information from said magnetic disk;
at least one battery for supplying electric power to said first and second drive means, and said head driver;
detecting means for sensing a voltage level of said at least one battery, and generating a voltage-drop signal when said voltage level has fallen below a predetermined limit;
control means, responsive to said voltage-drop signal, for controlling said first and second drive means and said head driver, said control means, in the event of reception of the voltage-drop signal after the start of an access to said magnetic disk, permitting the continuation of said access and inhibiting another access to the magnetic disk; and
a commanding device connected to said control means, for commanding said information storage and retrieval on or from said magnetic disk.

17. A system according to claim 16, wherein said commanding device comprises a battery-powered typewriter.

18. A system according to claim 16, wherein said commanding device comprises a battery-powered computer.

19. A system for information storage and retrieval on or from a magnetic disk, comprising:
- first drive means for rotating the magnetic disk;
- a magnetic head for said information storage and retrieval on or from said magnetic disk;
- second drive means for moving said magnetic head across a surface of said magnetic disk;
- a head driver for energizing said magnetic head to write information on and read the information from at least one said magnetic disk;
- at least one battery for supplying electric power to said first and second drive means, and said head driver;
- detecting means for sensing a voltage level of said at least one battery, and generating a voltage-drop signal when said voltage level has fallen below a predetermined limit;
- control means, responsive to said voltage-drop signal, for controlling said first and second drive means and said head driver, said control means, in the event of reception of the voltage-drop signal after the start of an access to said magnetic disk, permitting the continuation of one operation of the first drive means during said access to said magnetic disk, and inhibiting another operation of the first drive means during another access to the magnetic disk; and
- a commanding device connected to said control means, for commanding said information storage and retrieval on or from said magnetic disk.

20. A system according to claim 19, wherein said commanding device comprises a battery-powered typewriter.

21. A system according to claim 19, wherein said commanding device sends command signals to said control means to control said first and second drive means for operations of said magnetic disk and said magnetic head, said control means comprising means for preventing the control of said first and second drive means even when said command signals are received by said control means while said voltage-drop signal is present.

22. A system according to claim 21, wherein said control means sends a signal to said commanding device to indicate that the operation of said first drive means is inhibited due to a fall of said electric power of at least one battery below said predetermined limit.

* * * * *